US007352762B2

(12) United States Patent
T V et al.

(10) Patent No.: US 7,352,762 B2
(45) Date of Patent: Apr. 1, 2008

(54) METHOD AND SYSTEM FOR MESSAGING TO A CLUSTER

(75) Inventors: Venkateshwara T V, Bangalore (IN); Ajay Kumar, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 1001 days.

(21) Appl. No.: 10/445,701

(22) Filed: May 27, 2003

(65) Prior Publication Data
US 2004/0240458 A1 Dec. 2, 2004

(51) Int. Cl.
H04L 12/28 (2006.01)
(52) U.S. Cl. .................. 370/412; 370/428; 709/213
(58) Field of Classification Search ........... 370/412; 709/213, 229, 206; 719/313
See application file for complete search history.

(56) References Cited

U.S. PATENT DOCUMENTS

| 2002/0044560 | A1* | 4/2002 | Dally et al. ............ 370/401 |
| 2004/0098490 | A1* | 5/2004 | Dinker et al. .......... 709/229 |
| 2004/0143631 | A1* | 7/2004 | Banerjee et al. ....... 709/206 |
| 2004/0240462 | A1  | 12/2004 | T V |

OTHER PUBLICATIONS

Richard Monson-Haefel, "EJB Message-Driven Beans," http://www.onjava,com/lpt/a/1019, Sep. 2001, (28 pages).
"Message-Oriented Middleware Software Technology Review," http://www.sei.cmu.edu/str/descriptions/momt_body.html, Jan. 10, 2007, (4 pages).

"Java Message Service API," Chapter 1 and Chapter 2, The J2EE Tutorial Addendum, Feb. 10, 2003, (9 pages).
John Wetherill, "Messaging Systems and the Java Message Service," http://developer.java.sun.com/developer/technicalArticles/Networking/messaging/, Mar. 31, 2003 (5 pages).
"What is a Message Driven Bean?" http://www.theserverside.com/resources/article.jsp?l=Pramati-MDB, Mar. 31, 2003 (3 pages).
Benoy Jose, "Message Driven Beans," http://javaboutique.internet.com/articles/MDB/, Mar. 31, 2003 (3 pages).
Dion Almaer, "EJB 2 Message-Driven Beans," http://www.onjava.com/lpt/a/851, May 22, 2001, (8 pages).
Mike Bray "Middleware Software Technology Review," http://www.sei.cmu.edu/str/descriptions/middleware.html, Jun. 25, 1997, (4 pages).
"High Performance JMS Messaging," JMS Performance Benchmark White Paper, Chrimson Consulting Group, 2002, (9 pages).
Jonathan Baker, "Advanced Uses of Messaging for the Java™ 2 Platform, Enterprise Edition (J2EE™)," 2001, (45 pages).
Dean Jacobs, Building Active Web Sites Using the Java™ Message Service API (JMS), JavaOne, 2000, (28 pages).

* cited by examiner

*Primary Examiner*—Bob A. Phunkulh
(74) *Attorney, Agent, or Firm*—Robert C. Kowert; Meyertons, Hood, Kivlin, Kowert & Goetzel, P.C.

(57) ABSTRACT

A system and method for distributing and processing messages in a clustered environment may have a message producer, a message middleware component, and at a clustered message consumer coupled to the message middleware component through a router. The router may be configured to receive messages, select a node of the clustered consumer to handle each message, and send each message to a queue for the selected node. The router may balance a message load across the clustered nodes. The router of the clustered consumer may ensure that each message is processed by only one message consumer node of the cluster.

24 Claims, 5 Drawing Sheets

METHOD AND SYSTEM FOR MESSAGING TO A CLUSTER

BACKGROUND OF THE INVENTION

1. Field of the Invention

This invention relates to computer process messaging, and more particularly to managing messages in a clustered environment.

2. Description of the Related Art

As network functionality increases, it is becoming increasingly more important for systems to allow applications and application components to be distributed across networks (e.g., on multiple application servers). For applications and application components to be effectively distributed, various distributed parts of applications and application components (e.g., nodes) need to be able to communicate with each other. Nodes may communicate with each other using messaging to exchange information. The information may be sent and received by nodes using a predetermined message format and a destination address for the message. A node may be a software component or process that runs on a common computer or different computers connected by a network or networks. A node may be a message producer and/or a consumer. The predetermined message format may include a message header for message identification, a properties section for application-specific, provider-specific, and optional header fields, and a body section that contains the content of the message. The content of a message may include text, data packets, objects, or other information to be communicated between nodes.

Several different types of messaging techniques may be used for communicating between nodes including point-to-point and publish-and-subscribe. As seen in FIG. 1a, in a point-to-point (or queue) messaging system (generally a one-to-one delivery), a message 105 may be sent by a message producer 101 to a message consumer 103 through a message queue 110 (also known as a virtual channel). For example, a message producer 101 may send a message 105 to a message queue 110 for a message consumer 103. The message consumer 103 receives and processes the message 105 from the message queue 110.

As seen in FIG. 1b, in a publish-and-subscribe (or topic) messaging system (generally a one-to-many broadcast), the message producer 101 may be a publisher for a topic 123 (also known as a virtual channel) that sends a message 115 to several message consumers (known as subscribers) that have subscribed to the topic 123. For example, the message producer 101 may send a message 115 to a topic 123. Several nodes, such as the message consumer 103 and the second message consumer 121 may subscribe (e.g., request that messages of a certain type be sent to the node when available) to the topic 123. The topic 123 may deliver the message 115 to the message consumer 103 and the second message consumer 121. Message consumers not subscribed to the topic do not receive the message.

To facilitate sending and receiving messages, nodes typically connect to a messaging agent or middleware for implementing message queues and/or topics. One example of a messaging agent may be implemented according to the Java Messaging Service (JMS). Messages may be sent and received asynchronously, and nodes sending and receiving messages may not need to know anything about the nodes they are communicating with. This allows more freedom between nodes and makes it easier to design interfaces between nodes and easier to distribute applications and application components across a network.

Some network environments may utilize clustered systems (e.g., clustered message driven bean (MDB) containers). A clustered system may include nodes participating in a messaging system. A cluster may include multiple nodes that should behave as a single node in the messaging system. For example, a node may be a "bean" (e.g., an application component) clustered with other message driven beans. Message driven beans may use JMS to access message-oriented middleware (MOM) for messaging with other nodes (e.g., other MDBs or other message producers/consumers) in a network. A cluster of nodes may need to appear as a single producer/consumer for typical messaging systems. For example, confusion may result if two nodes in a cluster receive and process a topic message for which the cluster should appear to have subscribed to as a single entity. Also, a cluster may not be able to support different message-oriented middleware products.

SUMMARY OF THE INVENTION

In one embodiment, a system may have a message producer, a message middleware component, and a cluster of nodes with at least two nodes and a router that receives messages through the message middleware component. In one embodiment, the nodes may be configured to implement message driven beans in one or more application server containers. Other nodes are also contemplated. The router may be configured to receive a message from the message producer, select a node from the at least two nodes to distribute the message to, and send the message to a queue for the node in the at least two nodes. In one embodiment, the router may distribute the message independent of the middleware component. In one embodiment, the router may balance a message load across the at least two nodes using a round robin or random assignment scheme. In one embodiment, the node in the at least two nodes that the router selects may acknowledge receipt of the message, process the message, and transmit a result of the message processing to at least one other node in the at least two nodes. Several types of messages may be sent including streams of values that are written and read sequentially, pairs of data values including a string and a value, continuous streams of bytes to fit a predetermined message format, and serializable Java objects. For example, the message may be a Java Message Service (JMS) message and the node may implement a message driven bean (i.e., an application component) to consume the JMS message.

In one embodiment, a method for the messaging system may include receiving a message from a message producer, selecting a node of a message consumer (which may have a cluster of nodes), and sending the message to only the selected node in the cluster of nodes. In one embodiment, the selected node in the cluster of nodes may acknowledge receipt of the message to a message producer, process the message, and send the results of the processing of the message to at least one other node in the cluster of nodes. In one embodiment, a method may include receiving at least two messages, selecting different nodes in a cluster of nodes to receive each of the at least two messages, and sending each of the at least two messages to queues for the selected different nodes.

BRIEF DESCRIPTION OF THE DRAWINGS

A better understanding of the present invention may be obtained when the following detailed description is considered in conjunction with the following drawings.

Figure 1A:
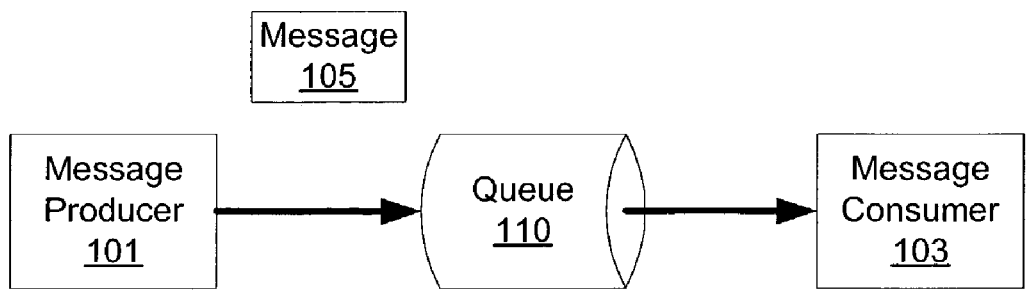
FIG. 1a illustrates a prior art example of a point-to-point messaging system.
Figure 1B:
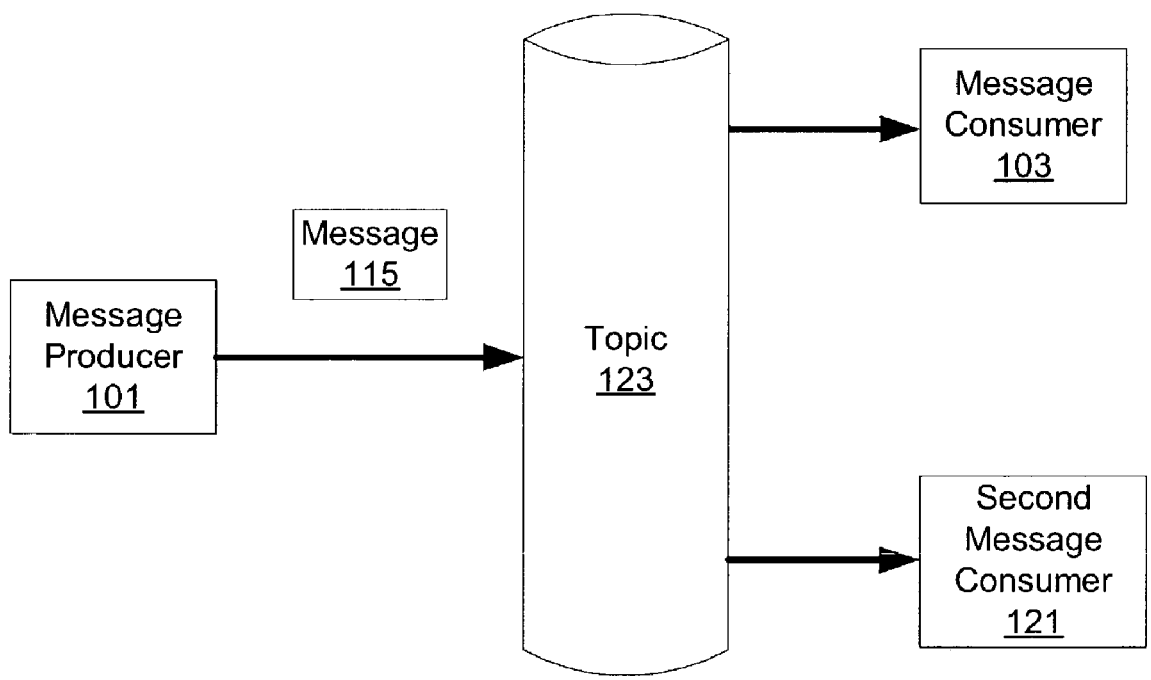
FIG. 1b illustrates a prior art example of a publish-and-subscribe messaging system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 2:
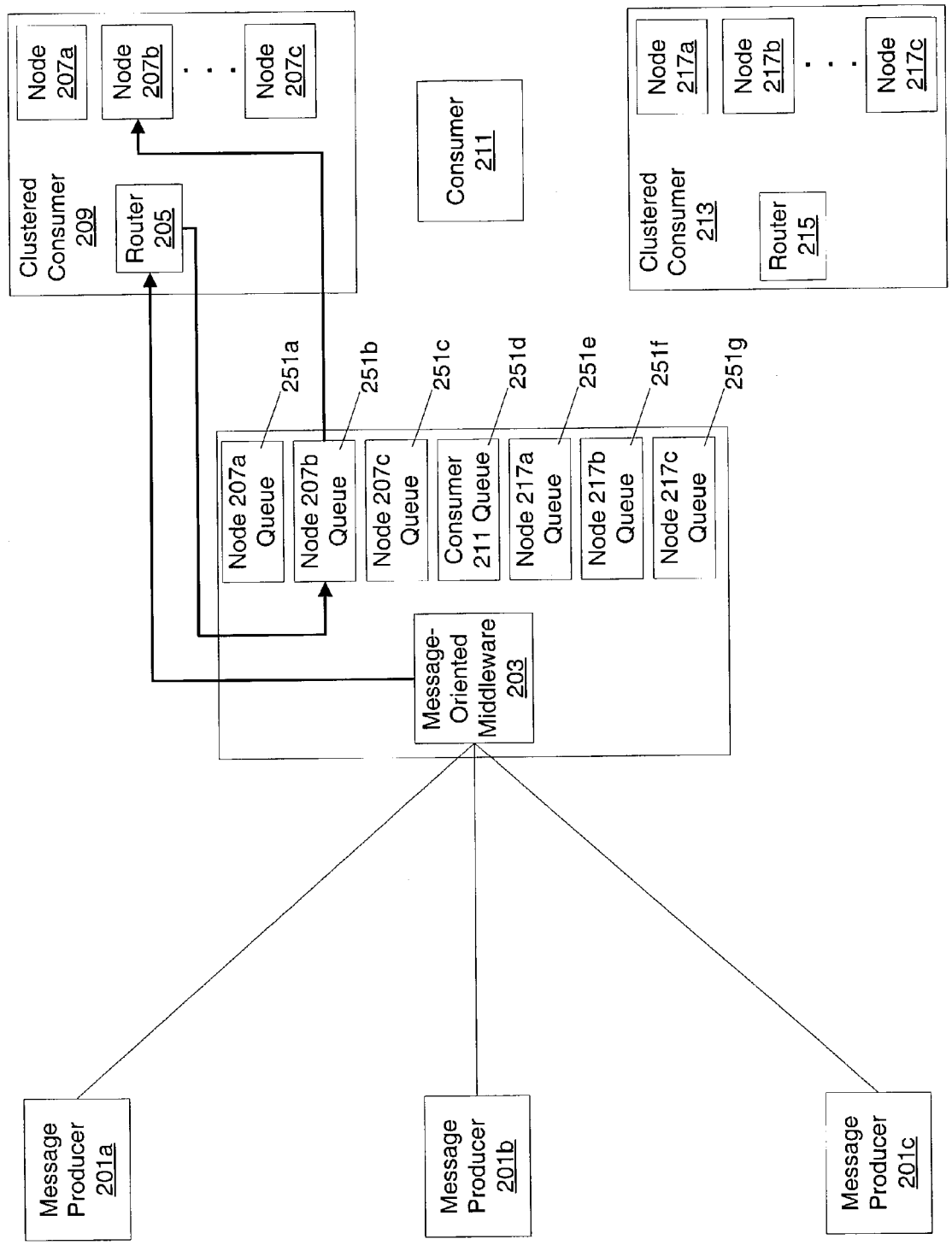
FIG. 2 illustrates a messaging system including multiple clustered consumers, according to an embodiment.

Referring to FIG. 2, an embodiment of a messaging system including multiple clustered consumers is illustrated. Message producers 201 (producer nodes), such as, but not limited to clients, peers, applications or application components, may need to communicate with other peers, applications or application components (message consumers) using a messaging system to pass information in messages. The message consumer may be a single consumer 211 or a clustered consumer 209 or 213 (e.g., a clustered message driven bean (MDB) container). Other message consumers are also contemplated. In one embodiment, the clustered consumer 209, 213 may include a router 205, 215 with multiple nodes 207, 217.

A messaging system may be used by a message producer that wants to send a message to a single message consumer (point-to-point) or group of message consumers (topic). For example, a message producer 201, such as, but not limited to, an application component on an application server, may produce messages with information for a message consumer (e.g., clustered consumer 209, 213 and/or message consumer 211) in the system. Messages may contain several different types of information such as, but not limited to, formatted data and requests for action. In addition, the messages may be in several different formats including, but not limited to, streams of values that are written and read sequentially, pairs of data values including a string and a value, serializable Java objects, and continuous streams of bytes to fit a predetermined message format. For example, the message may be a Java Message Service (JMS) message. The messages may be sent and received by the nodes asynchronously. For example, the messages may be stored in a queue prior to processing.

In one embodiment, the messages may be handled by a message middleware that may include, but is not limited to, message-oriented middleware (MOM) 203. In one embodiment, MOM may be software distributed between applications, operating systems, and networks. Other embodiments of message middleware 203 are also contemplated. The MOM may provide an Application Programming Interface (API) to allow application components to be distributed across networks and allow communication between the components and/or between applications by using the MOM system. For example, application components may use MOM for program-to-program data exchange. The MOM 203 may deliver each message to only one message consumer in a point-to-point transfer (queue). The MOM 203 may deliver the message to multiple message consumers in a topic message broadcast. In one embodiment, a router for a clustered consumer may receive the message from the MOM 203 in a point-to-point transfer or as a subscriber to a topic. The router may implement a load-balancing scheme to determine which node to deliver a particular message to. In one embodiment, the load-balancing scheme may include, but is not limited to, a round robin or random assignment scheme. Other delivery schemes are also contemplated. In one embodiment, a result of processing the message may be communicated to or available to the other nodes in the clustered consumer 309. In one embodiment, the router may interface to the MOM in a middleware neutral way so that different types of MOMs may be supported.

To the MOM 203 and/or message producers, the cluster 209 may appear to be a single node message consumer. The router 205 may subscribe to topics and/or connect to queues for the clustered consumer 209. Thus, the router 205 may receive messages directly from the MOM 203 or other message provider. The router 205 ensures that each message is processed by only one node 207 of the cluster such that the cluster 209 acts as a single consumer in the messaging system. For example, the router 205 may receive a message from a message queue. The router 205 may select a single one of the message consumer nodes 207 of the cluster 209 to process the message. For a subsequent message received from the same queue, the router 205 may select an entirely different node 207 of the cluster 209 to handle the message. For topic messages, the router 205 receives each topic message as a topic subscriber and then selects a single one of the nodes 207 of the cluster 209 to process the topic message. Subsequent topic messages received by the router 205 may be routed to the same node 207 or to other nodes 207 of the cluster 209; however, each message is processed by only one node 207 for the cluster 209. The MOM 203 may establish a queue 251 for each message consumer in the cluster 209. When the router 205 selects a node 207 to handle a message, the router 205 puts the message in the appropriate queue 251 for the selected cluster node 207. Each node 207 processes messages from its respective queue 251. For example, the router 205 may select node 207b to process a message. The router 205 may put the message into the queue 251b for the node 207b. The node 207b may receive the message from the queue 251b when it requests the next message. The router 205 may be implemented separate from the cluster, on a separate system in the cluster 209, or on the same system as one or more of the cluster nodes 207.

Figure 3:
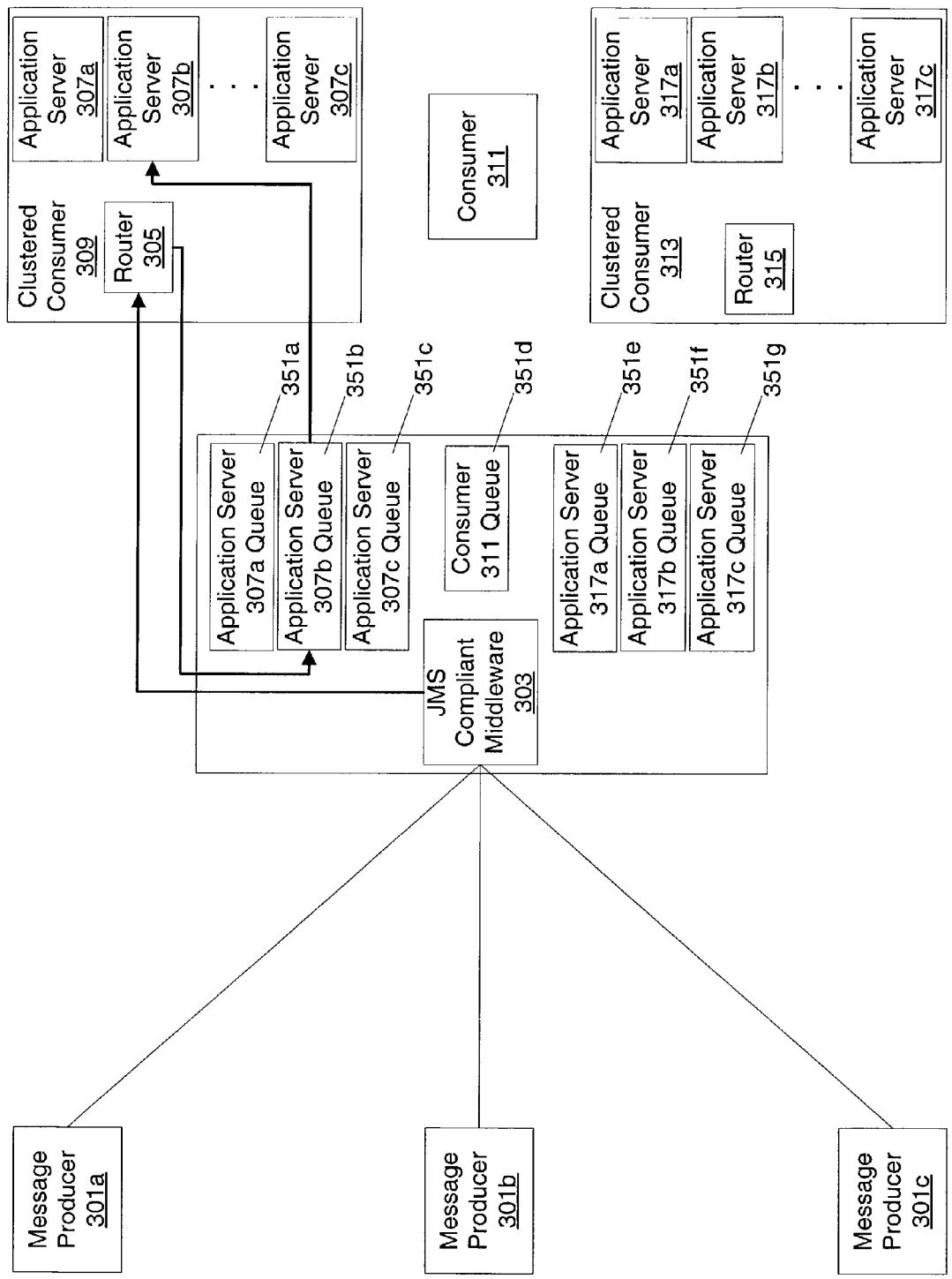
FIG. 3 illustrates a JMS based messaging system including multiple clustered application servers, according to an embodiment.

Referring to FIG. 3, an embodiment of a JMS based messaging system including multiple clustered application servers is shown. In one embodiment, a message producer 301 may produce messages that are provided to a messaging middleware, such as, but not limited to, a Java Messaging Service (JMS) compliant middleware 303. In one embodiment, the JMS compliant middleware 303 may provide the message to a router 305 for a cluster of nodes in a clustered consumer 309. In one embodiment, each node may be implemented within an application server container. For example, application servers 307a, 307b, and 307c may potentially receive the message, however, in one embodiment of the messaging system only one application server consumer node may process the message. Each application server 307 may contain one or more message consumer nodes of the cluster. In one embodiment, the router 305 may use a load-balancing scheme or other scheme to pick an application server to process the message. In one embodiment, the router 305 may put the message in the respective application server node's queue 351. For example, if the router chooses application server 307*b* to process the message, the router 305 may put the message into queue 351*b* to be delivered to the application server 307*b*. In one embodiment, the application server that processes the message may process the message with a message driven bean node (not shown). In one embodiment, a result of processing the message may be communicated or available to the other nodes in the clustered consumer 309. In one embodiment, a different queue may be established in the middleware 303 for each message consumer node within each application server container.

Figure 4:
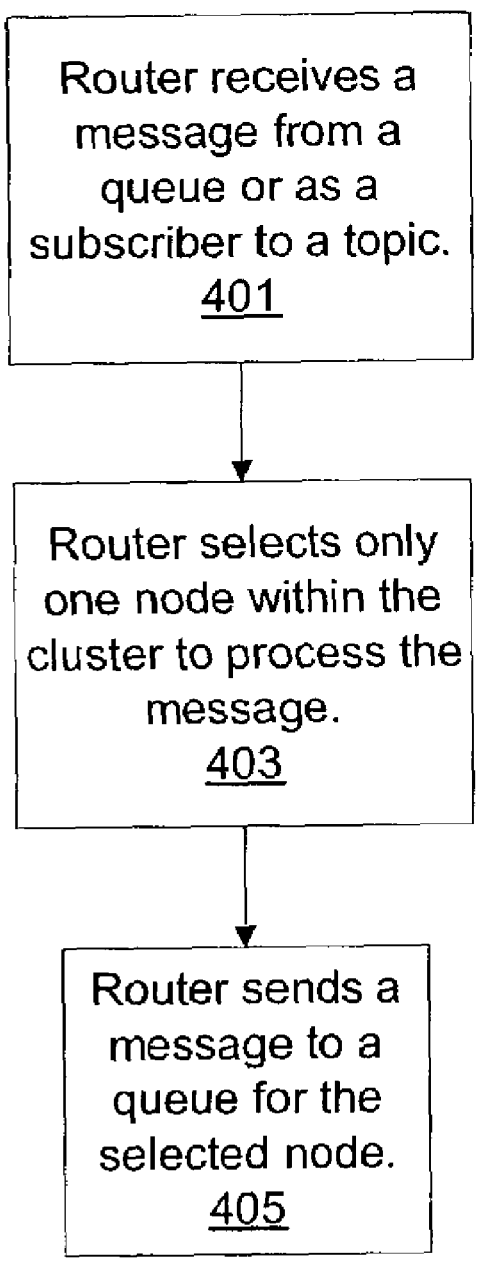
FIG. 4 illustrates a flowchart for a router selecting a node to process a message, according to an embodiment.

FIG. 4 illustrates a flowchart of an embodiment for routing messages in a clustered message consumer. It should be noted that in various embodiments of the methods described herein, one or more of the methods described may be performed concurrently, in a different order than shown, or may be omitted entirely. Other additional methods may also be performed as desired.

In 401, a router may receive a message from a queue (e.g., a point-to-point transfer) or as a subscriber to a topic. In one embodiment, the router may receive the message from a MOM. The MOM may have received the message from a message producer. In one embodiment, the message may contain formatted data or requests for action. In addition, the message may be in several different formats in different embodiments.

In 403, the router may select one node within a consumer cluster of nodes to process the message. A router may determine which node to send the message to for processing. When the message is first received by the router, it may be kept in a queue until it is sent to a node. In selecting which node to send the message to, a load-balancing scheme may be implemented. For example, the load-balancing scheme may include, but is not limited to, a round robin or work load based scheme. Other routing schemes are also contemplated.

In 405, the message may be sent to a queue for the selected node in the cluster. In one embodiment, the router may put the message in a dynamic queue assigned to the selected node. In one embodiment, each node may have a unique temporary queue inside the MOM. Only the selected node may process the message for the cluster. In one embodiment, the selected node may send an acknowledgment of receipt of the message to the message producer. In another embodiment, a router may send an acknowledgement of receipt of the message to the MOM or message producer.

Figure 5:
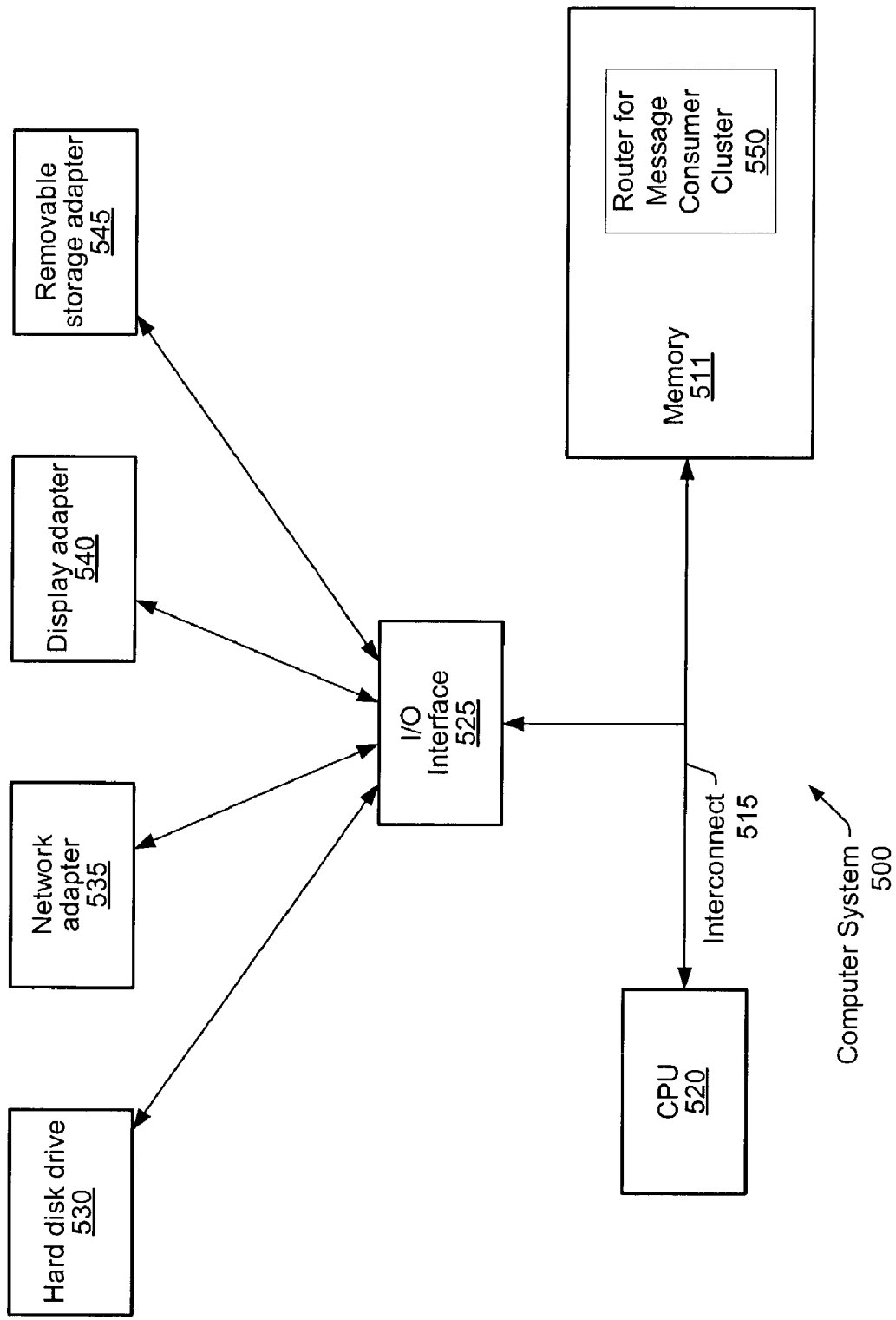
FIG. 5 illustrates a system implementing a router to select a node to process a message, according to an embodiment.

FIG. 5 illustrates an embodiment of a system for implementing a router to select a node to process a message. In one embodiment, a computer system 500 may include a central processing unit (CPU) 520 coupled to a memory 511 and an input/output (I/O) interface 525. In one embodiment, an interconnect 515 may be used to couple the CPU to the memory 511. The memory 511 may implement a router for a message consumer cluster 550. In one embodiment, the I/O interface 525 may be coupled to a hard disk drive 530, a network adapter 535, a display adapter 540, and a removable storage adaptor 545. Other components may also be coupled to the I/O interface.

Various embodiments may further include receiving or storing instructions and/or information implemented in accordance with the foregoing description upon a computer accessible medium. Suitable computer accessible media may include storage media or memory media such as magnetic or optical media, e.g., disk or CD-ROM, random access memory, or other memory, as well as transmission media or signals such as electrical, electromagnetic, or digital signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system, comprising:
    a message producer;
    a message middleware component configured to receive messages from the message producer;
    a cluster of nodes comprising at least two nodes; and
    a router configured to:
        receive a message from the message middleware component;
        select one of the at least two nodes to process the received message for the cluster, wherein each of the nodes of the cluster is operable to process the received message to produce a message result for the cluster; and
        send the received message to a queue for the selected node so that only one of the nodes in the cluster processes the message to produce the message result for the cluster.

2. The system as recited in claim 1, wherein the router is configured to receive the message from a message queue of the message middleware component.

3. The system as recited in claim 1, wherein the router is configured to receive the message as a subscriber to a topic.

4. The system as recited in claim 1, wherein the selected node is configured to make the message result of the message processing available to the other nodes of the cluster.

5. The system as recited in claim 1, wherein the router is configured to receive a plurality of messages from the message middleware component and select one of the nodes of the cluster to handle each message according to a load balancing scheme such that each message is processed by only one node of the cluster.

6. The system as recited in claim 1, wherein the nodes of the cluster are configured as message driven beans in one or more application server containers.

7. The system as recited in claim 1, wherein the message is a Java Message Service (JMS) message and each of the nodes implements a message driven bean.

8. The system as recited in claim 1, wherein the router comprises a message middleware neutral interface to the message middleware component such that the router may participate in messaging with a plurality of different types of message middleware components.

9. A method, comprising:
receiving a plurality of messages at a clustered message consumer comprising a plurality of message consumer nodes;
for each message of the plurality of messages, selecting one of the nodes of the clustered message consumer to process the message to produce a message result, wherein each of the plurality of message consumer nodes is operable to process the message to produce a message result for the clustered message consumer; and
routing each message of the plurality of messages to a queue of only the node in the clustered message consumer selected for that message so that each message is processed by only one message consumer node of the clustered message consumer.

10. The method as recited in claim 9, wherein the message results of processing the plurality of messages are available to all of the plurality of message consumer nodes of the clustered message consumer.

11. The method as recited in claim 9, wherein at least one message of the plurality of messages is a Java Message Service (JMS) message and at least one node of the plurality of message consumer nodes comprises a message driven bean.

12. The method as recited in claim 9, wherein said selecting is performed according to a load-balancing scheme for the plurality of message consumer nodes of the clustered message consumer.

13. The method as recited in claim 9, wherein each message consumer node of the plurality of message consumer nodes is implemented within an application server container.

14. The method as recited in claim 9, wherein the clustered message consumer interacts with message producers or with a message oriented middleware component as a single message consumer.

15. The method as recited in claim 9, wherein said receiving a plurality of messages comprises receiving one of the messages from a message queue, and wherein said selecting comprises selecting a different message consumer node than handled a previous one of the messages from the same message queue.

16. The method as recited in claim 9, wherein said receiving a plurality of messages comprises receiving one of the messages from a message topic, and wherein said selecting comprises selecting a different message consumer node than handled a previous one of the messages from the same message topic.

17. A computer-readable storage medium comprising program instructions, wherein the program instructions are computer-executable to implement:
receiving a plurality of messages at a clustered message consumer comprising a plurality of message consumer nodes;
for each message of the plurality of messages, selecting one of the nodes of the clustered message consumer to process the message to produce a message result, wherein each of the plurality of message consumer nodes is operable to process the message to produce a message result for the clustered message consumer; and
routing each message of the plurality of messages to a queue of only the node in the clustered message consumer selected for that message so that each message is processed by only one message consumer node of the clustered message consumer.

18. The computer-readable storage medium as recited in claim 17, wherein the message results of processing the plurality of messages are available to all of the plurality of message consumer nodes of the clustered message consumer.

19. The computer-readable storage medium as recited in claim 17, wherein at least one message of the plurality of messages is a Java Message Service (JMS) message and at least one node of the plurality of message consumer nodes comprises a message driven bean.

20. The computer-readable storage medium as recited in claim 17, wherein said selecting is performed according to a load-balancing scheme for the plurality of message consumer nodes of the clustered message consumer.

21. The computer-readable storage medium as recited in claim 17, wherein each message consumer node of the plurality of message consumer nodes is implemented within an application server container.

22. The computer-readable storage medium as recited in claim 17, wherein the clustered message consumer interacts with message producers or with a message oriented middleware component as a single message consumer.

23. The computer-readable storage medium as recited in claim 17, wherein said receiving a plurality of messages comprises receiving one of the messages from a message queue, and wherein said selecting comprises selecting a different message consumer node than handled a previous one of the messages from the same message queue.

24. The computer-readable storage a medium as recited in claim 17, wherein said receiving a plurality of messages comprises receiving one of the messages from a message topic, and wherein said selecting comprises selecting a different message consumer node than handled a previous one of the messages from the same message topic.

* * * * *